United States Patent
Wijaya et al.

(10) Patent No.: US 8,209,073 B2
(45) Date of Patent: Jun. 26, 2012

(54) CLIMATE CONTROL SYSTEM AND METHOD FOR OPTIMIZING ENERGY CONSUMPTION OF A VEHICLE

(75) Inventors: Halim Wijaya, Canton, MI (US); Gerhard A. Dage, Franklin, MI (US); Wayne Frank Buescher, Canton, MI (US); Christopher Mark Greiner, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 443 days.

(21) Appl. No.: 12/436,413

(22) Filed: May 6, 2009

(65) Prior Publication Data
US 2010/0286830 A1 Nov. 11, 2010

(51) Int. Cl.
*B60H 1/00* (2006.01)
(52) U.S. Cl. ............ 701/22; 701/36; 701/53; 700/276; 165/42
(58) Field of Classification Search ............ 701/22, 701/36, 53; 700/287; 165/202, 42; G05B 15/00; B60H 1/00
See application file for complete search history.

(56) References Cited

U.S. PATENT DOCUMENTS

| | | | | | |
|---|---|---|---|---|---|
| 3,983,930 | A | * | 10/1976 | Franz | 165/204 |
| 4,132,086 | A | | 1/1979 | Kountz | |
| 4,667,480 | A | | 5/1987 | Bessler | |
| 5,275,012 | A | * | 1/1994 | Dage et al. | 62/208 |
| 5,316,074 | A | * | 5/1994 | Isaji et al. | 165/43 |
| 5,516,041 | A | | 5/1996 | Davis, Jr. et al. | |
| 5,579,994 | A | | 12/1996 | Davis, Jr. et al. | |
| 5,617,730 | A | * | 4/1997 | Suzuki | 62/133 |
| 5,785,244 | A | | 7/1998 | McBroom | |
| 5,988,517 | A | | 11/1999 | Bauer et al. | |
| 6,260,363 | B1 | | 7/2001 | Ye et al. | |
| 6,460,356 | B1 | * | 10/2002 | Tao et al. | 62/175 |
| 6,615,595 | B2 | | 9/2003 | Baruschke et al. | |
| 6,637,229 | B1 | * | 10/2003 | Forrest et al. | 62/230 |
| 7,591,143 | B2 | * | 9/2009 | Zeigler et al. | 62/236 |
| 7,654,307 | B2 | * | 2/2010 | Bhatti et al. | 165/42 |
| 7,681,630 | B2 | * | 3/2010 | Klassen et al. | 165/202 |
| 2002/0157414 | A1 | * | 10/2002 | Iwanami et al. | 62/239 |
| 2003/0085031 | A1 | * | 5/2003 | Forrest et al. | 165/202 |
| 2003/0233839 | A1 | * | 12/2003 | Hirose et al. | 62/186 |
| 2005/0045322 | A1 | * | 3/2005 | Yoshida et al. | 165/202 |
| 2005/0257545 | A1 | | 11/2005 | Ziehr et al. | |
| 2006/0086117 | A1 | | 4/2006 | Lee et al. | |
| 2006/0142898 | A1 | | 6/2006 | Mirza et al. | |
| 2007/0299560 | A1 | * | 12/2007 | LaHue et al. | 700/276 |
| 2008/0217080 | A1 | * | 9/2008 | Maier | 180/65.3 |

OTHER PUBLICATIONS

Zhihong Liang, Lei Li, "HybridPACK2—advanced cooling concept and package technology for Hybrid Electric Vehicles", Publication Year: 2008, pp. 1-5, Vehicle Power and Propulsion Conference, 2008. VPPC '08. IEEE, Digital Object Identifier: 10.1109/VPPC.2008.4677722.*

* cited by examiner

*Primary Examiner* — Tuan C. To
(74) *Attorney, Agent, or Firm* — David B. Kelley; Brooks Kushman P.C.

(57) ABSTRACT

A climate control system and method for optimizing energy consumption in a hybrid electric vehicle (HEV) is provided. By varying evaporator temperatures based on occupant settings and environmental conditions, electric compressor speed can be optimized to provide the necessary cooling capacities resulting in energy savings. Determining the impact that increasing or decreasing engine cooling fan speed has on the overall energy consumption of the climate control system without affecting target discharge air temperature provides for energy saving opportunities. Optimizing energy consumption according to the provided strategy provides for improved fuel economy without sacrificing passenger comfort.

14 Claims, 7 Drawing Sheets

| COOLING DEMAND | $T_{evap1}$ (F) |
|---|---|
| 0 | 39 |
| 20 | 39 |
| 40 | 42 |
| 60 | 44 |
| 80 | 45 |
| 100 | 47 |
| 120 | 48 |
| 140 | 50 |
| 160 | 50 |
| 180 | 50 |
| 200 | 55 |
| 220 | 55 |
| 240 | 55 |
| 255 | 55 |

Fig. 7

FOG PROBABILITY LOOKUP TABLE FOR DETERMINING $\Delta T_{evap}$

| | FOG PROBABILITY | $\Delta T_{evap}$ |
|---|---|---|
| 0 | 0 | 0 |
| 1 | 16 | 1 |
| 2 | 32 | 2 |
| 3 | 48 | 3 |
| 4 | 64 | 4 |
| 5 | 80 | 5 |
| 6 | 96 | 6 |
| 7 | 112 | 8 |
| 8 | 128 | 15 |
| 9 | 140 | 20 |
| 10 | 160 | 25 |

Fig. 8

CLIMATE CONTROL SYSTEM AND METHOD FOR OPTIMIZING ENERGY CONSUMPTION OF A VEHICLE

BACKGROUND

1. Technical Field

The present invention relates to a climate control system and method for optimizing energy consumption in a vehicle.

2. Background Art

Automatic climate control is increasingly prevalent in vehicles today. In some vehicles, a driver merely chooses a temperature setting, and a control system operates a climate control system to achieve the desired temperature. The climate control system may control the functions of a fan—e.g., on/off and fan speed—and an air conditioning system. Such a climate control system may also control the position and movement of various air dampers, or air flow doors, to control movement of air through an evaporator core or a heater core, the recirculation of air through the vehicle, the intake of fresh air, or some combination thereof.

The air conditioning system uses an air conditioning compressor and a condenser to effectuate cooling of a passenger cabin of the vehicle. A cooling fan is disposed adjacent the condenser to further effectuate cooling. One limitation of such systems is that operation of the air conditioning compressor and/or the cooling fan uses a relatively large amount of energy.

Moreover, some automatic climate control systems monitor a temperature and humidity level of the vehicle cabin to determine if a defogging operation of the windshield is desirable. When it is determined that an automatic defogging operation is desired, the air conditioning system is typically operated to provide a supply of relatively dry air to the windshield to quickly effect the defogging operation.

In the case of a conventional vehicle, where the engine mechanically drives the compressor, the increased load on the engine reduces efficiency and increases fuel consumption. Opportunities for controlling climate control systems to improve fuel economy are limited because the compressor power consumption depends upon the speed of the engine. Further, hot air mixing done to achieve a desired target discharge temperature often results in significant energy waste.

In the case of a hybrid electric vehicle (HEV), operation of an electric compressor and a cooling fan often necessitates starting the engine to ensure that the battery is not over-discharged. One of the benefits of an HEV is the fuel savings achieved by driving the vehicle using electric motor power, while maximizing the time the engine is shut down. Thus, inefficient operation of the climate control system can offset some of the benefits gained by driving an HEV. Accordingly, a need exists for a system and method for vehicle climate control that strikes a balance between meeting the comfort requirements of vehicle occupants and minimizing the overall power consumed by the climate control system.

BRIEF DESCRIPTION OF THE DRAWINGS

FIG. 7 is a simplified, exemplary lookup table utilized by the system in accordance with the embodiment depicted in FIG. 6; and FIG. 8 is another simplified, exemplary lookup table utilized by the system in accordance with the embodiment depicted in FIG. 6.

DETAILED DESCRIPTION

Figure 1:
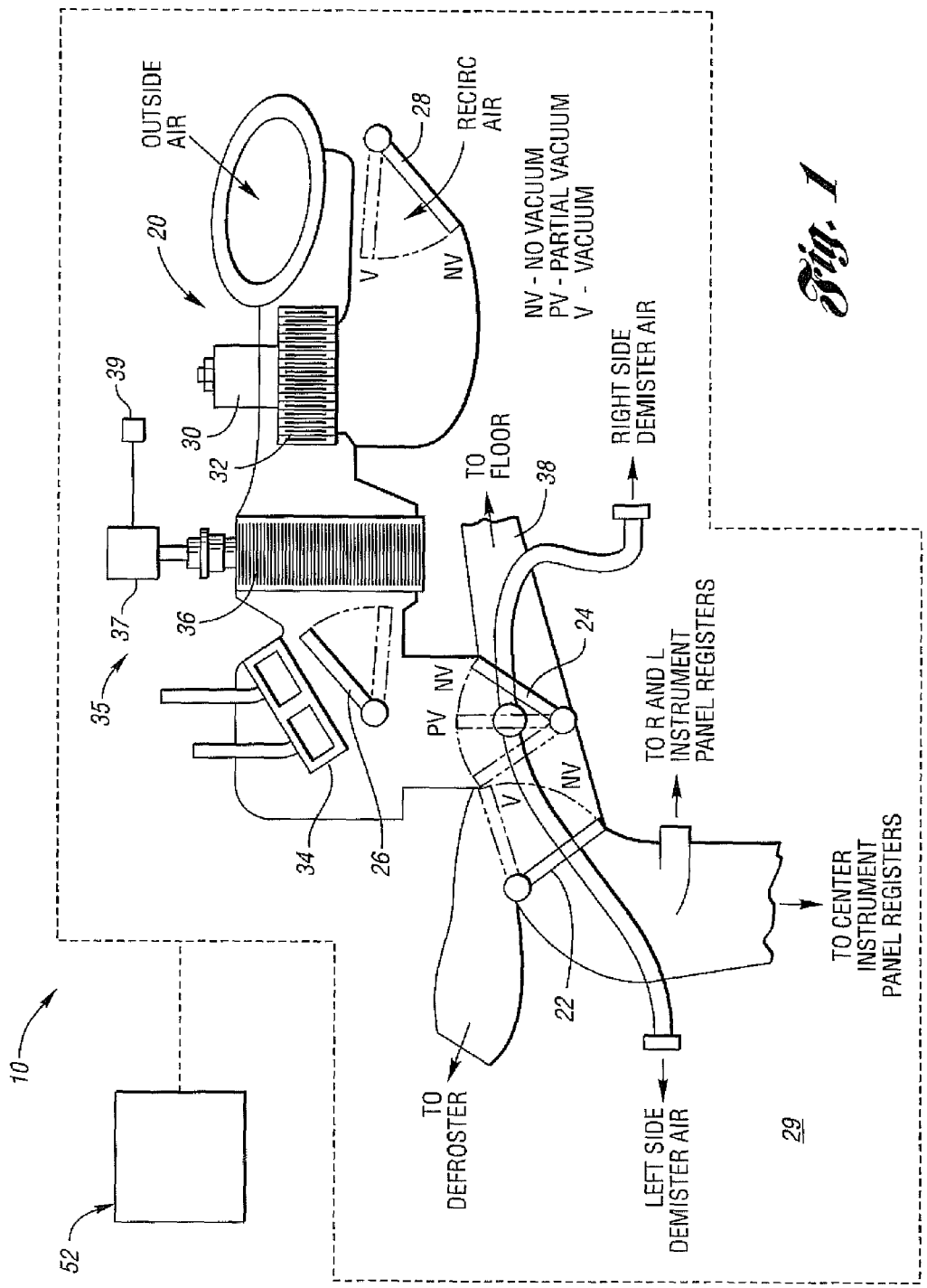
FIG. 1 is a simplified, exemplary schematic diagram illustrating a system for optimizing energy consumption in a vehicle in accordance with an embodiment of the present application.

In general, control of cabin temperature, as well as temperature and defogging of a windshield, within an automobile is accomplished using various actuators to adjust the temperature and flow of air supplied to the cabin of the vehicle. FIG. 1 schematically shows an exemplary system 10 for environmental management of a vehicle in accordance with an embodiment of the present application. The vehicle may include a heating, ventilating and air conditioning (HVAC) system, generally indicated at 20. The HVAC system 20 can include the arrangement of airflow doors, including panel-defrost, floor-panel, and outside recirculated air actuators or doors 22, 24, and 28, respectively.

The doors may be part of an air distribution system for directing the flow of conditioned air to various locations within a passenger cabin 29 of the vehicle, such as to the windshield, floor, or instrument panel as is commonly known. The doors 22, 24 and 28 may be driven by vacuum motors (not shown) between their various vacuum, partial vacuum and no vacuum positions in a conventional fashion as indicated in FIG. 1, or may be driven by an electric servo motor. A temperature control blend door 26 may also provided, and may be driven by an electric servo motor (not shown). The temperature control blend door 26 provides for hot air mixing done to obtain a desired target discharge air temperature, which reflects the temperature of air as it exits the HVAC system 20 into the passenger cabin 29.

The HVAC system 20 may also include a variable speed fan system (also referred to herein as an HVAC blower) 30 including a blower wheel 32 for generating airflow. The HVAC system 20 may further include a heating system, shown in FIG. 1 as a heater core 34, and an air conditioning system 35, including an evaporator core 36 and a compressor 37. The compressor 37 may be an electric compressor rather than one that is mechanically driven by an engine. This can provide greater control of the operation of the HVAC system 20, in that electric compressors can be configured for variable speed operation, unlike their mechanical counterparts whose speed is inextricably linked with the speed of the engine. The air conditioning system 35 may include other various components known to one of ordinary skill in the art, some of which are described below in greater detail with respect to FIG. 2.

The heater core 34 and the evaporator core 36 respectively heat and cool the airflow generated by the fan system 30. The generated airflow may be distributed through an airflow distribution system and associated ducting 38. The HVAC system 20 may control the temperature, the direction of the airflow, and the ratio of fresh air to recirculated air. The HVAC system 20 may further include a low-pressure cycle switch 39 that communicates with the compressor 37. The low-pressure switch 39 may be operable to deactivate the compressor 37 under certain conditions. In addition, the compressor 37 can be deactivated when the evaporator core temperature drops below a predetermined value; this helps to prevent freezing of the evaporator core 36.

Figure 2:
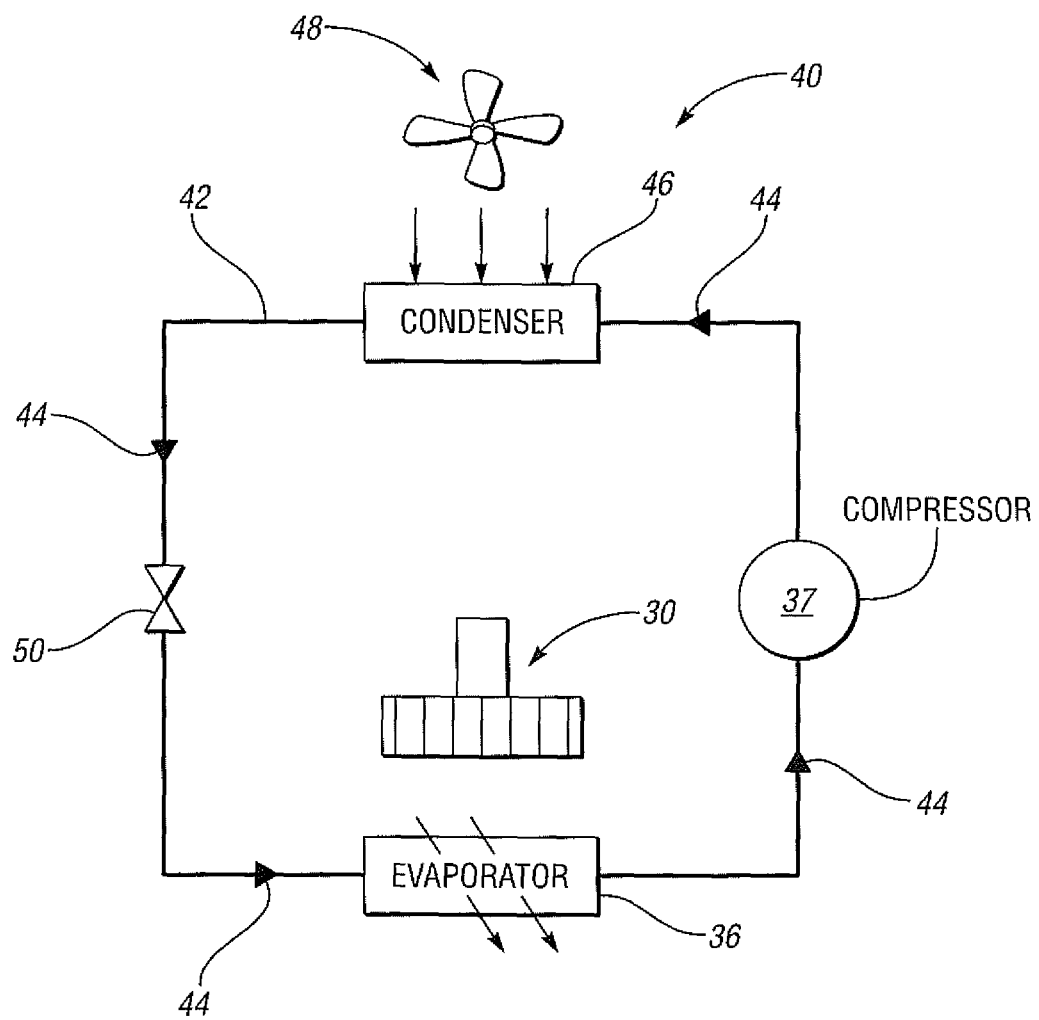
FIG. 2 is a simplified, exemplary schematic diagram illustrating a refrigeration cycle of a vehicle air conditioning system.

FIG. 2 depicts a simplified, exemplary schematic representation of a refrigeration cycle 40 of the air conditioning system 35. As seen therein, working fluid, such as a refrigerant, cycles through a fluid conduit 42 in the direction generally shown by arrows 44. The air conditioning system 35 may include a condenser 46 in fluid communication with the compressor 37. The compressor 37 may be driven by an electric motor (not shown). The working fluid may enter the compressor 37 as a low-pressure gas. The compressor 37 compresses the working fluid turning it into a high-pressure gas. The compressed gas heats as it is pressurized. The working fluid may then enter the condenser 46 to dissipate heat. The condenser 46 may include a plurality of fins (not shown) or the like for transferring heat to ambient air. An engine cooling fan 48 may also be provided to effectuate the exchange of heat. As heat dissipates, the working fluid condenses into a liquid.

The liquid working fluid may then enter an expansion device 50, as is known in the art, which is in fluid communication with the condenser 46. As the working fluid moves through the expansion device 50, the pressure drops causing the working fluid to evaporate into a cooler, low-pressure gas. The evaporator core 36 may be provided in fluid communication with the expansion device 50 and the compressor 37. Upon reaching the evaporator 36, the working fluid absorbs heat thereby cooling the ambient air proximate to the evaporator. The HVAC blower 30 may be provided to further effectuate the cooling and force the cooled air into, for example, the passenger cabin 29 of the vehicle through the ducting 38. The working fluid, now a cold, low-pressure gas, may then re-enter the compressor 37 and the cycle repeats.

Figure 3:
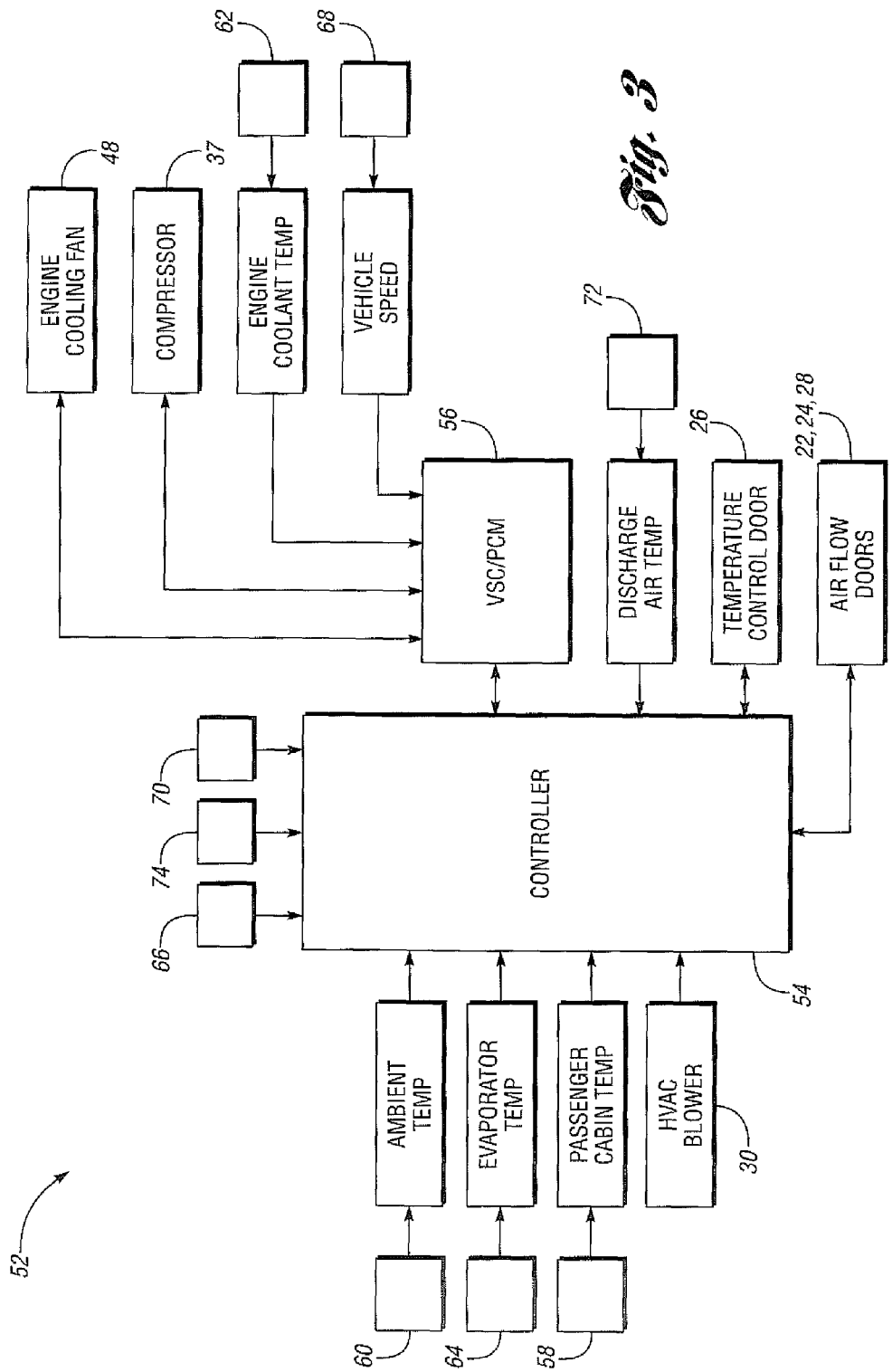
FIG. 3 is a simplified, exemplary block diagram illustrating a climate control system in accordance with an embodiment of the present application.

As described in more detail below, operation of the HVAC system 20 may be controlled by a climate control system 52. FIG. 3 shows an exemplary block diagram of the climate control system 52, including an electronic controller 54. The controller 54 can generate signals to control the HVAC system 20 according to a variety of inputs. The controller 54 may receive inputs from a number of climate control devices either directly or indirectly from, for example, another control module electrically coupled to the controller, such as a vehicle system control/powertrain control module (VSC/PCM) 56. As an example, the controller 54 may receive inputs from a passenger cabin temperature sensor 58, an ambient temperature sensor 60, an engine coolant temperature sensor 62, an evaporator temperature sensor 64, a humidity sensor 66, a vehicle speed sensor 68, a solar load sensor 70, and a discharge air temperature sensor 72. The sensors 58-72 may respectively provide signals that are representative of interior cabin temperature, ambient (outside) air temperature, engine coolant temperature (ECT), evaporator temperature, relative humidity of the passenger cabin, vehicle speed, solar energy including direction and angle of sunlight entering the vehicle, and discharge air temperature (i.e., the temperature of the air being discharged from the HVAC system 20 into the vehicle cabin).

In addition to receiving inputs from the sensors 58-72, the controller 54 may also receive inputs from a vehicle occupant via an input device 74. The input device 74 may be a control head as commonly used in vehicle instrument panels and illustrated in FIG. 4. As explained more fully below, the input device 74 may allow a vehicle occupant to set a desired passenger cabin temperature, and the HVAC system 20 may operate automatically to achieve and maintain the occupant set temperature. Further, the input device 74 may allow a vehicle occupant to manually control the HVAC functions, and in some cases, override an automatic operation of the HVAC system 20. The controller 54 may control operation of the compressor 37 and the engine cooling fan 48, as well as the doors 22-28 to regulate the temperature and flow of air, and ultimately to maintain the comfort of driver and passengers in the vehicle. In addition, the controller 54 may be programmed with an algorithm to effect automatic defogging of the vehicle windshield.

Figure 4:
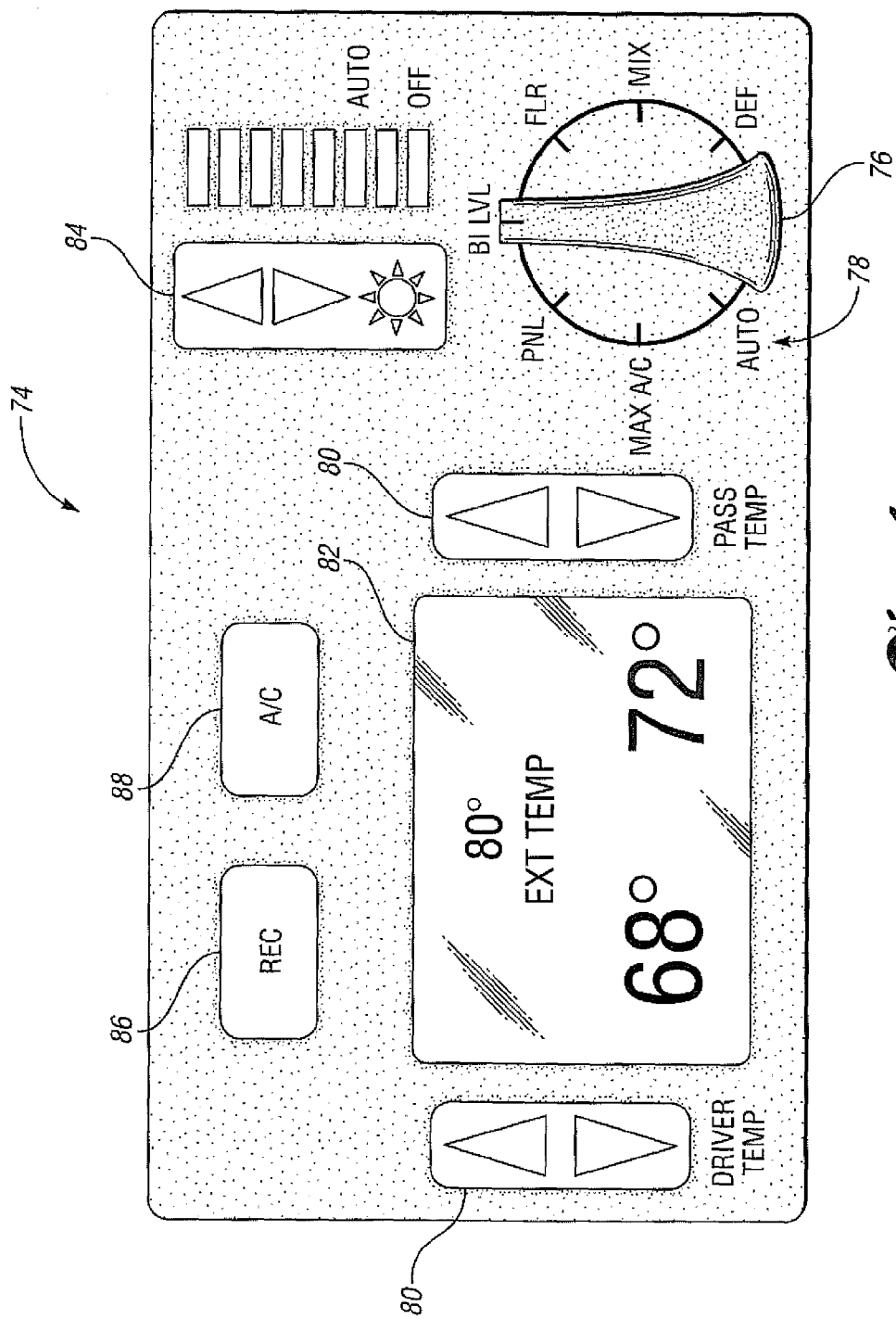
FIG. 4 is a simplified, exemplary front plan view of a control head illustrated schematically in FIG. 3.

FIG. 4 illustrates in greater detail an exemplary control head 74, schematically shown in FIG. 3. The control head 74 can act as an input device for vehicle occupants, allowing manual selection of various climate control functions. A mode selector switch 76 allows an occupant to choose where airflow will be directed. The mode selector switch 76 may include an automatic (AUTO) setting 78, which allows the climate control system to regulate passenger cabin temperature as well as control various climate control functions automatically based upon environmental conditions and/or vehicle operating characteristics. One or more temperature selector switches 80 can provide air temperature control of the passenger cabin in both the manual and automatic modes. The temperature selector switches 80 may include a driver temperature selector switch and a passenger temperature selector switch for dual-zone temperature control. In the automatic mode, the temperature selector switches 80 may be used by an occupant to select a desired cabin temperature, which can be displayed by a display panel 82. The climate control system 52 may then operate to achieve and maintain the occupant set temperature automatically. The display panel 82 may further display current cabin temperature, current outside ambient temperature, or the like.

The climate control head 74 may include a fan selector switch 84 for providing on-off, manual and automatic speed control of the HVAC blower 30. A recirculation switch 86 allows for full recirculation of cabin air, all fresh air, or some combination thereof. Further, an A/C switch 88 allows an occupant to manually select air conditioning. The control head 74 is just one example of a control head that can be used in accordance with embodiments of the present application. Other control heads, including other analog or digital control heads may also be used.

Figure 5:
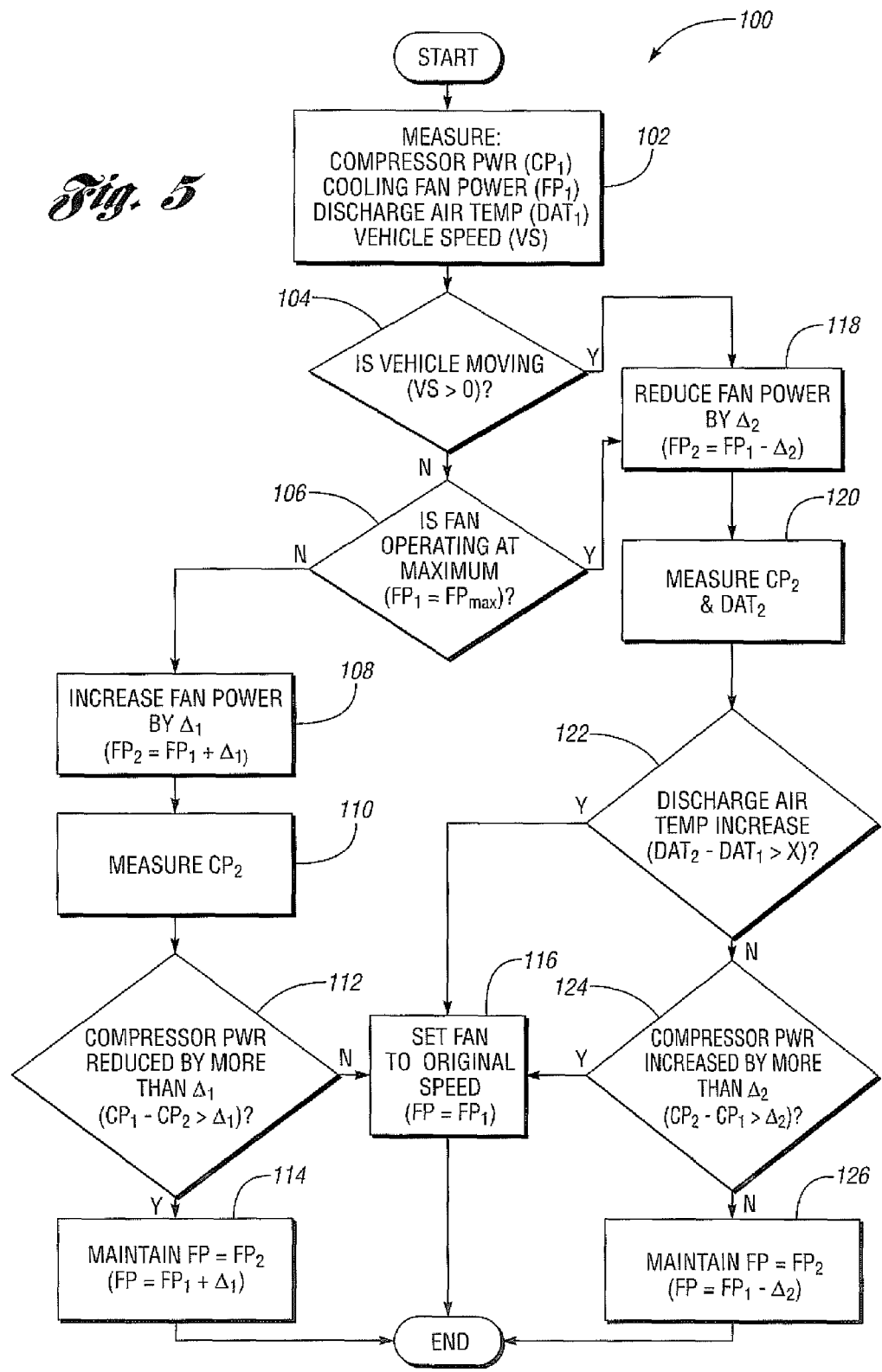
FIG. 5 is a simplified, exemplary flowchart depicting a methodology according to an embodiment of the present application.

Turning now to FIG. 5, a simplified, exemplary flow diagram depicting a method 100 for optimizing energy consumption of the climate control system 52 when the air conditioning system 35 is being operated is illustrated. The methodology of FIG. 5 may provide for constant monitoring of the energy consumption of the engine cooling fan 48 and the electric compressor 37, as well as the discharge air temperature into the passenger cabin 29. To this end, the present application contemplates that at least two power curves may be generated and mapped to one or more lookup tables, namely an engine cooling fan power curve as a function of cooling fan speed (not shown) and an electric compressor power curve as a function of compressor speed (not shown). Once a target discharge air temperature is achieved, a total energy consumption value of the climate control system 52 may be calculated. Using the lookup tables, the strategy employed by the methodology of FIG. 5 can determine whether lowering compressor speed and increasing engine cooling fan speed will result in a lower total energy consumption by the climate control system without significantly affecting the target discharge air temperature.

As shown in FIG. 5, several vehicle operating characteristics corresponding to the climate control system 52 may be measured at step 102. For example, a first compressor power value ($CP_1$), a first engine cooling fan power value ($FP_1$), a first discharge air temperature value ($DAT_1$), and current vehicle speed (VS) may be measured. $CP_1$ may correspond to a current amount of power being consumed by the electric compressor 37, while $FP_1$ may correspond to the amount of power being consumed by the engine cooling fan 48 at the same time. Similarly, $DAT_1$ corresponds to the current temperature of the air being discharged into the passenger cabin 29 from an airflow door by the HVAC blower 30.

Once the vehicle operating characteristics are measured, the system may determine whether the vehicle is in motion at step 104. For example, the system may conclude that the vehicle is moving if VS is greater than 0 mph. If the vehicle is not moving, there may be an opportunity to increase cooling fan speed in an effort to reduce total power consumption. Accordingly, the system may next determine if the engine cooling fan 48 is operating at its maximum rated power ($FP_{max}$), as provided at step 106. If $FP_1$ is not at its maximum, then more cooling power can be added by increasing the engine cooling fan speed. As previously discussed, the cooling fan power curve as a function of cooling fan speed and the compressor power curve as a function of compressor speed may be mapped to one or more lookup tables. Thus, for the sake of simplicity, it can be assumed that a reference made to an increase or decrease in cooling fan power refers to an increase or decrease in cooling fan speed, and vice versa, respectively. Likewise, a reference made to an increase or decrease in compressor power may also refer to an increase or decrease in compressor speed, and vice versa, respectively.

Therefore, if $FP_1$ is less than $FP_{max}$, the engine cooling fan power may be increased by a predetermined amount ($\Delta_1$), as shown at step 108. In this regard, cooling fan speed is increased by an amount that corresponds to an increase in cooling fan power of $\Delta_1$. $\Delta_1$ may be determined in one of several ways without departing from the scope of the present application. As one example, $\Delta_1$ may be determined according to one or more lookup tables, and may be affected by one or more environmental conditions, such as the ambient outside temperature. This is because the cooling impact of the engine cooling fan 48 may be more sensitive at higher temperatures. Additional lookup tables for determining $\Delta_1$ may be necessary for different vehicle speeds because the amount of air flowing through the condenser varies. As another example, $\Delta_1$ may be a constant value selected in accordance with design criteria and/or other vehicle and system restraints, constraints and specifications. The exemplary methodology of FIG. 5 may be performed several times each second and, thus, optimal cooling fan power may be determined through an iterative process.

As a result of the increase in cooling fan power, a second cooling fan power value is obtained ($FP_2$), where $FP_2$ equals $FP_1$ plus $\Delta_1$. Next, at step 110, a second compressor power value ($CP_2$) is measured corresponding to the amount of power being consumed by the electric compressor 37 once $FP_2$ is obtained. It may next be determined whether increasing the engine cooling fan power by $\Delta_1$ resulted in a reduction in the amount of compressor power being consumed. Often, adding cooling power by increasing the engine cooling fan speed can allow the electric compressor speed to be reduced without substantially affecting the discharge air temperature. At step 112, it may be determined whether the compressor power was reduced by an amount greater than $\Delta_1$. In other words, as provided in FIG. 5, is $CP_1 - CP_2 > \Delta_1$?

Should it be determined that compressor power consumption was reduced by an amount greater than the additional power, $\Delta_1$, being consumed by the engine cooling fan as a result of increasing the cooling fan speed, then it may be concluded that the increase in cooling fan power resulted in a net overall reduction in power consumption by the climate control system. As previously discussed, the less power consumed by the climate control system, the less the drain is on a vehicle's battery. Preserving battery charge can minimize the amount of time the engine is on, thereby improving fuel economy. Accordingly, if it is determined that the electric compressor power consumption was reduced by more than $\Delta_1$, then the engine cooling fan power may be maintained at $FP_2$, as provided by step 114. On the other hand, if increasing the cooling fan power by $\Delta_1$ did not result in a reduction of compressor power more than $\Delta_1$, then the cooling fan speed may be set to its initial speed measured at step 102, where cooling fan power is equal to $FP_1$, as provided at step 116. This is because increasing the cooling fan speed did not result in a net overall power savings for the climate control system.

Returning to step 104, if it is determined that the vehicle is moving, the method may proceed to step 118. Likewise, the method may proceed to step 118 should it be determined at step 106 that the engine cooling fan 48 is operating at its maximum rated power, $FP_{max}$. In other words, the methodology may proceed to step 118 if either the vehicle is moving or the engine cooling fan speed cannot be increased any further. At step 118, the power being supplied to the engine cooling fan 48 may be reduced by a predetermined amount ($\Delta_2$), providing the second cooling fan power value, $FP_2$. Again, $\Delta_2$ may be determined in much the same way as $\Delta_1$. Once the cooling fan power has been reduced, the power being consumed by the electric compressor 37 is measured again to provide the second compressor power value, or $CP_2$, at step 120. Likewise at step 120, the discharge air temperature is remeasured to provide a second discharge air temperature value ($DAT_2$). Thus, input corresponding to the impact that reducing the engine cooling fan speed has on compressor speed and discharge air temperature can be obtained.

The method may then proceed to step 122 where it may be determined whether the discharge air temperature increased by more than a predetermined amount (X). If it is determined that the discharge air temperature did increase by an amount greater than X, then the engine cooling fan power may be set or returned to the first cooling fan power value, $FP_1$, as provided at step 116. Although optimizing total power consumption by the climate control system in the air conditioning mode is part of the strategy illustrated in FIG. 5, the impact on passenger comfort is to be minimized. If the discharge air temperature increases too much, passenger comfort may be compromised. Accordingly, the predetermined amount X may be any nominal amount, such as 2° F., 4° F., or the like. Alternatively or additionally, X may vary based upon the automatic temperature setting input by an occupant. In any event, should reducing the cooling fan power result in a sufficient increase in the discharge air temperature, the cooling fan power may be returned to its original value, $FP_1$.

On the other hand, should it be determined that the discharge air temperature did not increase by an amount greater than X, it may then be determined at step 124 whether the electric compressor power consumption increased by more than $\Delta_2$ as a result of the reduction in cooling fan power. In other words, it may be determined whether $CP_2 - CP_1 < \Delta_2$. If it is determined that the amount of power being consumed by the electric compressor 37, as a result of reducing the cooling fan power, increased by an amount greater than $\Delta_2$, then the method may proceed to step 116 where the cooling fan power is set to the first cooling fan power value, $FP_1$. The reason for this is that although power consumption by the cooling fan 48 was reduced by $\Delta_2$, such a reduction may result in an increase in the power consumed by the electric compressor 37 by more than $\Delta_2$ in order to achieve or otherwise maintain the automatic cabin temperature setting value. Thus, the result would be a net gain in overall power consumption, which is to be avoided. If, however, it is determined that reducing the cooling fan power by $\Delta_2$ does not result in a compressor power increase by more than $\Delta_2$, a net overall reduction in power consumption by the climate control system may be realized. In this instance, the reduction of cooling fan power by $\Delta_2$ may be maintained, as provided at step 124.

It should be noted that the methodology depicted in FIG. 5 may be continually and repeatedly performed by the climate control system 52 in order to systematically implement a total power consumption strategy. To this end, each loop through the method 100 may occur several times per second, e.g., every 100 ms, 500 ms, or the like. The frequency with which the method 100 is performed may differ from what is otherwise provided herein without departing from the scope of the present application.

Figure 6:
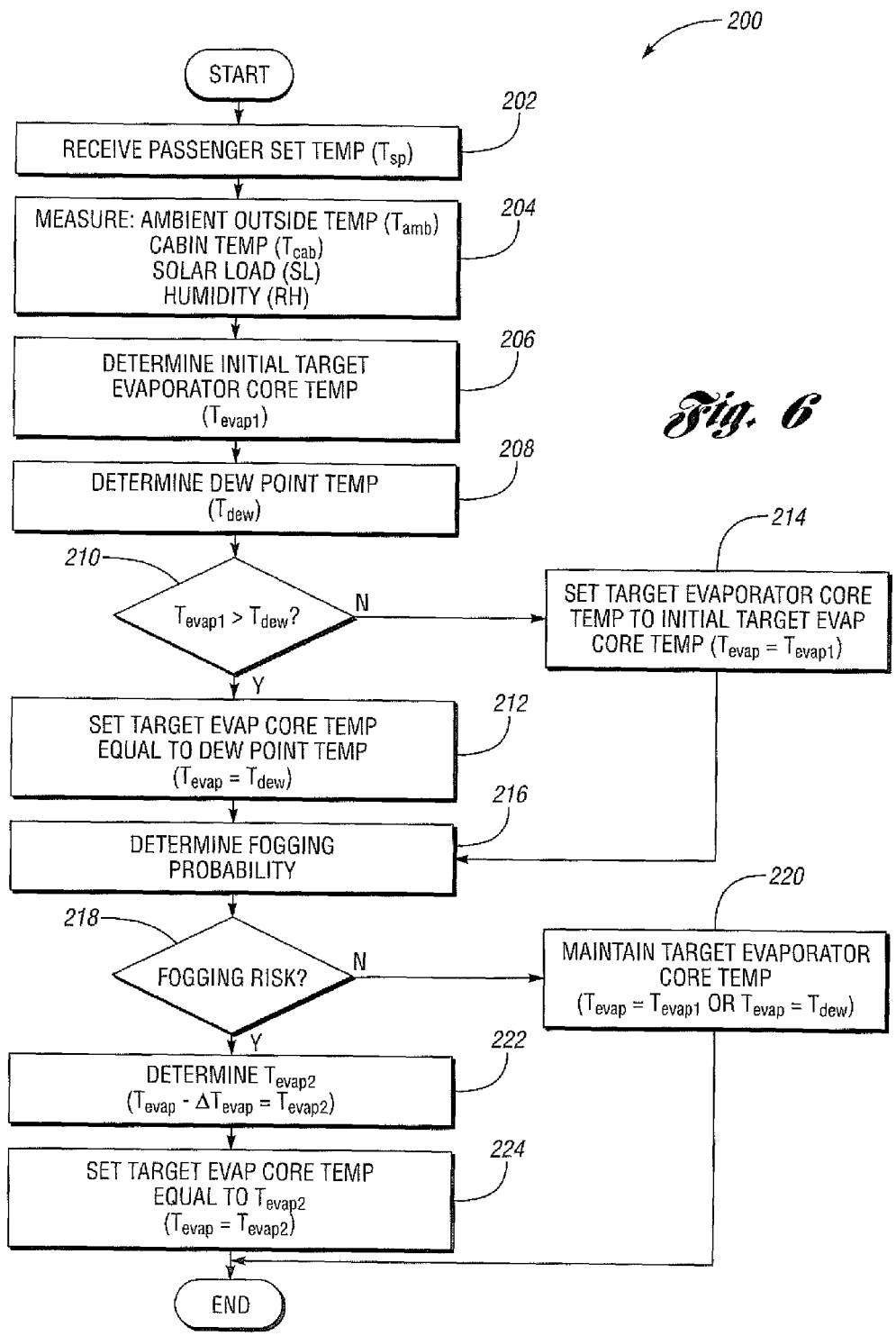
FIG. 6 is a simplified, exemplary flowchart depicting a methodology according to an alternate embodiment of the present application.

Turning now to FIG. 6, a simplified, exemplary flow diagram depicting an alternate method 200 for managing power consumption of the climate control system 52 is illustrated. The strategy employed in FIG. 6 may define or otherwise determine variable evaporator core temperatures based upon occupant climate control settings and one or more environmental conditions. The variable evaporator core temperatures are calculable and calibratable based upon specific design requirements and/or specifications. By varying evaporator core temperatures, electric compressor speed may be optimized to provide the necessary cooling capacities while achieving energy savings. Further, method 200 may operate to minimize unnecessary hot air mixing that provides the target discharge air temperature (so as to lessen the amount of cooling energy needed to overcome the unnecessary hot air mixing). Thus, the methodology employed in FIG. 6 can likewise provide fuel economy optimization while maintain a certain level of passenger comfort.

As shown in FIG. 6, a passenger set cabin temperature ($T_{sp}$) may be received at step 202. The passenger set temperature, $T_{sp}$, corresponds to an occupant desired automatic temperature setting communicated to the controller 54 via the control head 74. At step 204, a plurality of vehicle operating characteristics, which can include one or more environmental conditions, may be measured. For example, the plurality of vehicle operating characteristics may include the measurement of ambient outside temp ($T_{amb}$), interior cabin temperature ($T_{cab}$), solar load (SL), and the relative humidity (RH). Next, at step 206, an initial target evaporator core temperature ($T_{evap1}$) may be determined. $T_{evap1}$ may be determined as a function of cooling demand according to a look-up table, such as table 90 depicted in FIG. 7, where cooling demand can be based upon $T_{amb}$, $T_{cab}$ and SL.

Referring briefly to FIG. 7, a cooling demand value between 0 and 255 may be obtained, where 0 represents a maximum cooling demand value and 255 represents a minimum cooling demand value. For example, a cooling demand value of 0 may correspond to relatively high $T_{amb}$, $T_{cab}$ and SL values, while a cooling demand value of 255 may correspond to relatively low $T_{amb}$, $T_{cab}$ and SL values. Various other combinations of $T_{amb}$, $T_{cab}$ and SL may result in some intermediate cooling demand value between 0 and 255. Once cooling demand is obtained, $T_{evap1}$ may be determined, as shown in FIG. 7. The table 90 of FIG. 7 may be populated with calibrated values as a result of extensive testing.

It should be noted that $T_{evap1}$ may provide a target evaporator core temperature base point representative of the target temperature in a dry air setting. The method may then proceed to step 208 wherein a dew point temperature ($T_{dew}$) may be determined according to the following exemplary equation:

$$T_{dew} = \frac{b\alpha(T_{amb}, RH)}{a - \alpha(T_{amb}, RH)} \quad \text{(Eq. 1)}$$

where, $$\alpha(T_{amb}, RH) = \frac{a * T_{amb}}{b + T_{amb}} + \ln(RH)$$

$$a = 17.27$$

$$b = 237.7° \text{ C.}$$

$T_{dew}$ may account for how much humidity is present in the passenger cabin 29. It may then be determined whether the initial target evaporator core temperature, $T_{evap1}$, is greater than the dew point temperature, $T_{dew}$, at step 210. If $T_{evap1}$ is greater than $T_{dew}$, then the target evaporator core temperature ($T_{evap}$) may be set equal to the dew point temperature, $T_{dew}$, as provided at step 212. Setting $T_{evap}$ equal to $T_{dew}$ can adjust for the impact of relative humidity on passenger comfort. Alternatively, if it is determined that $T_{evap1}$ is not greater than $T_{dew}$, then the target evaporator core temperature, $T_{evap}$, may be set to the initial target evaporator core temperature, $T_{evap1}$, as provided at step 214.

Once the target evaporator core temperature, $T_{evap}$, is set to either the dew point temperature, $T_{dew}$, or the initial target evaporator core temperature, $T_{evap1}$, the methodology may proceed to step 216. At step 216, a fogging probability may be determined. The fogging probability may be determined by one or more known methods understood by those skilled in the art. For example, fogging probability may be determined according to methods disclosed in U.S. Pat. No. 5,516,041, entitled Method And Control System For Controlling An Automotive HVAC System To Prevent Fogging, which is hereby incorporated by reference in its entirety.

Determining the fogging probability at step 216 may produce a fogging probability value (Y). At step 218, it may be determined whether there exists a risk that a vehicle windshield will fog based upon the fogging probability value, Y. Should it be determined that a risk of fogging does not exist, the method may proceed to step 220 wherein the target evaporator core temp, $T_{evap}$, is maintained. If, however, it is determined that a risk of windshield fogging does exist based upon the fogging probability value, Y, then a second target evaporator core temperature ($T_{evap2}$) may be determined at step 222. To this end, the current target evaporator core temperature, $T_{evap}$, may be reduced by a predetermined amount ($\Delta T_{evap}$), wherein $\Delta T_{evap}$ can be determined based upon a lookup table, such as table 92 depicted in FIG. 8. In this regard, the fogging probability value, Y, may correspond with $\Delta T_{evap}$ to determine the second target evaporator core temperature, $T_{evap2}$. Next, the target evaporator core temperature, $T_{evap}$, may be set equal to $T_{evap2}$ at step 224, and the climate control system 52 is operated accordingly.

Again, the methodology 200 of FIG. 6 may provide a control strategy that defines variable evaporator temperatures based on occupant settings and various environmental conditions, such as ambient outside temperature, cabin temperature, solar load, and relative humidity. By varying the evaporator temperature, electric compressor speed may be optimized to provide the necessary cooling capacities resulting in energy savings.

Additionally or alternatively, the control strategy provided by method 200 may operate to avoid and/or minimize any unnecessary hot air mixing typically present in conventional climate control systems to provide the desired target discharge air temperature. As a result, the methodology 200 may provide a strategy for fuel economy optimization while minimizing the effect on passenger comfort.

It should be noted that the methods of FIGS. 5 and 6 as described herein are exemplary only, and that the functions or steps of the methods could be undertaken other than in the order described and/or simultaneously as may be desired, permitted and/or possible.

While the best mode for carrying out the invention has been described in detail, those familiar with the art to which this invention relates will recognize various alternative designs and embodiments for practicing the invention as defined by the following claims.

What is claimed:

1. A climate control method for a vehicle comprising:
   increasing cooling fan power by a predetermined amount when the vehicle is not moving and the cooling fan power is not at its maximum; and
   setting cooling fan speed based at least in part upon whether compressor power is reduced by an amount greater than the predetermined amount as a result of increasing the cooling fan power.

2. The method of claim 1, further comprising:
   comparing the cooling fan power to a maximum cooling fan power value to detect when the cooling fan is not operating at maximum power.

3. The method of claim 1, further comprising sensing a first compressor power value and a first cooling fan power value prior to increasing the cooling fan power by the predetermined amount.

4. The method of claim 3, wherein the step of setting the cooling fan speed comprises:
   sensing a second compressor power value after increasing the cooling fan power by the predetermined amount; and
   setting the cooling fan speed based upon whether the second compressor power value is less than the first compressor power value by an amount greater than the predetermined amount.

5. The method of claim 4, wherein a second cooling fan power value is obtained by increasing the first cooling fan power value by the predetermined amount.

6. The method of claim 5, wherein setting the cooling fan speed comprises:
   maintaining the cooling fan speed associated with the second cooling fan power value when the compressor power is reduced by an amount greater than the predetermined amount.

7. The method of claim 5, wherein setting the cooling fan speed comprises:
   setting the cooling fan speed so that cooling fan power equals the first cooling fan power value when the compressor power is not reduced by an amount greater than the predetermined amount.

8. The method of claim 1, wherein the predetermined amount is based at least in part upon a lookup table.

9. A climate control method for a vehicle comprising:
   reducing cooling fan power by a predetermined amount when the vehicle is moving or the cooling fan power is at its maximum; and
   setting cooling fan speed based at least in part upon a determination whether discharge air temperature increased and whether compressor power is increased by an amount greater than the predetermined amount as a result of reducing the cooling fan power.

10. The method of claim 9, further comprising:
    sensing a first compressor power value, a first cooling fan power value, and a first discharge air temperature value.

11. The method of claim 10, wherein the determination whether the compressor power is increased by an amount greater than the predetermined amount comprises:
    sensing a second compressor power value after reducing the cooling fan power by the predetermined amount; and
    comparing the difference between the second compressor power value and the first compressor power value to the predetermined amount.

12. The method of claim 11, wherein a second cooling fan power value is obtained by increasing the first cooling fan power value by the predetermined amount.

13. The method of claim 12, wherein setting the cooling fan speed comprises:
    maintaining the cooling fan speed associated with the second cooling fan power value when the discharge air temperature is not increased and the compressor power is increased by an amount less than the predetermined amount.

14. The method of claim 12, wherein setting the cooling fan speed comprises:
    setting the cooling fan speed so that cooling fan power equals the first cooling fan power value when the discharge air temperature is increased or the compressor power is increased by an amount greater than the predetermined amount.

* * * * *